United States Patent
Sumiyashiki et al.

(10) Patent No.: US 10,214,178 B2
(45) Date of Patent: Feb. 26, 2019

(54) WEBBING TAKE-UP DEVICE

(71) Applicant: KABUSHIKI KAISHA TOKAI-RIKA-DENKI-SEISAKUSHO, Aichi (JP)

(72) Inventors: Akira Sumiyashiki, Aichi (JP); Wataru Yanagawa, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 57 days.

(21) Appl. No.: 15/329,840

(22) PCT Filed: Jul. 2, 2015

(86) PCT No.: PCT/JP2015/069206
§ 371 (c)(1),
(2) Date: Jan. 27, 2017

(87) PCT Pub. No.: WO2016/021344
PCT Pub. Date: Feb. 11, 2016

(65) Prior Publication Data
US 2017/0259781 A1    Sep. 14, 2017

(30) Foreign Application Priority Data

Aug. 7, 2014 (JP) .................. 2014-161258

(51) Int. Cl.
*B60R 22/41* (2006.01)
*B60R 22/46* (2006.01)
*B60R 22/28* (2006.01)

(52) U.S. Cl.
CPC .......... *B60R 22/41* (2013.01); *B60R 22/4676* (2013.01); *B60R 2022/286* (2013.01); *B60R 2022/288* (2013.01)

(58) Field of Classification Search
CPC ............... B60R 22/41; B60R 22/4676; B60R 2022/286
See application file for complete search history.

(56) References Cited

U.S. PATENT DOCUMENTS 6,416,008 B1 * 7/2002 Fujii ................... B60R 22/4676
242/379.1
8,240,591 B2 * 8/2012 Aihara ................ B60R 22/4676
242/374

(Continued)

FOREIGN PATENT DOCUMENTS

JP    2008-094280 A    4/2008

OTHER PUBLICATIONS

International Search Report issued in a corresponding application PCT/JP2015/069206 dated Sep. 8, 2015.

*Primary Examiner* — Sang K Kim
(74) *Attorney, Agent, or Firm* — Roberts Mlotkowski Safran Cole & Calderon, P.C.

(57) ABSTRACT

A webbing take-up device in which, when a pretensioner mechanism is activated and turning of a pinion relative to a spool is allowed, a lock pawl is turned by the pinion and a trigger wire is sheared by the lock pawl. Thereafter, the pinion turns more relative to the lock pawl and shears a lock pin of the lock pawl. Hence, the lock pawl turns and activates an activation mechanism. Therefore, the activation mechanism may be activated without a torsion shaft of a force limiter mechanism allowing turning of a lock base in the take-up direction relative to the spool.

7 Claims, 11 Drawing Sheets

(56) References Cited

U.S. PATENT DOCUMENTS

2008/0087754 A1 4/2008 Aihara et al.
2008/0203210 A1* 8/2008 Nagata .............. B60R 22/4676
　　　　　　　　　　　　　　　　　　　242/396.1

* cited by examiner

WEBBING TAKE-UP DEVICE

CROSS REFERENCE TO RELATED APPLICATIONS

The present application is a U.S. National Phase of PCT/JP2015/069206 filed on Jul. 2, 2015 claiming priority to Japanese Patent application No. 2014-161258 filed Aug. 7, 2014. The disclosure of the PCT Application is hereby incorporated by reference into the present Application.

TECHNICAL FIELD

The present invention relates to a webbing take-up device that allows pulling out of the webbing by loads at or above a force limiter load in a predetermined situation.

BACKGROUND ART

In a webbing take-up device recited in Japanese Patent Application Laid-Open (JP-A) No. 2008-94280, during an emergency state of a vehicle, turning of a first lock base in a pull-out direction is regulated but a force limiter mechanism allows turning of a spool in the pull-out direction by loads at or above a force limiter load. The force limiter load can be switched by activation of a second lock mechanism.

In this webbing take-up device, during the emergency state of the vehicle, a pretensioner mechanism turns the first lock base in the take-up direction and a torsion shaft of the force limiter mechanism allows the first lock base to turn in the take-up direction relative to the spool. As a result, the second lock mechanism is activated via a wire.

SUMMARY OF INVENTION

Technical Problem

In consideration of the circumstances described above, an object of the present invention is to provide a webbing take-up device in which an activation unit may be activated without a force limiter mechanism allowing turning of a regulating member in a take-up direction relative to a spool.

Solution to Problem

A webbing take-up device according to a first aspect of the present invention includes: a spool onto which a webbing to be applied to a vehicle occupant is taken up, the webbing being taken up due to the spool turning in a take-up direction, and the spool being turned in a pull-out direction due to the webbing being pulled out; a regulation unit at which a regulating member that turns together with the spool is provided, the regulation unit regulating turning of the regulating member in the pull-out direction in a predetermined situation; a force limiter mechanism that, when the regulation unit regulates turning of the regulating member in the pull-out direction, allows turning of the spool in the pull-out direction relative to the regulating member by a load that is at least a force limiter load; a pretensioner mechanism at which a turning member is provided, the pretensioner mechanism turning the spool in the take-up direction in the predetermined situation by turning the turning member in the take-up direction; an allowing unit that, when the pretensioner mechanism turns the turning member in the take-up direction, allows turning of the turning member in the take-up direction relative to the spool by a predetermined turning amount; and an activation unit that is capable of switching the force limiter load, due to the activation unit being activated as a result of the turning of the turning member in the take-up direction relative to the spool being allowed by the allowing unit.

In a webbing take-up device according to a second aspect of the present invention, in the webbing take-up device of the first aspect of the present invention, the activation unit is activated due to the force limiter mechanism allowing the turning of the spool in the pull-out direction relative to the regulating member.

A webbing take-up device according to a third aspect of the present invention, in the webbing take-up device of the first aspect or second aspect of the present invention, further includes an activating body that is provided at the activation unit and is connected to at least one of a turning member side or a spool side, the activation unit being activated due to the connection to the at least one of the turning member side or the spool side being released and the activating body being moved, by the turning of the turning member in the take-up direction relative to the spool, which is allowed by the allowing unit.

In a webbing take-up device according to a fourth aspect of the present invention, in the webbing take-up device of the third aspect of the present invention, the activation unit is activated by the turning of the spool in the pull-out direction relative to the regulating member, which is allowed by the force limiter mechanism allowing movement of the activating body by the turning member, releasing the connection to the spool side, and the activating body being moved.

Advantageous Effects of Invention

In the webbing take-up device according to the first aspect of the present invention, the webbing is taken up onto the spool when the spool is turned in the take-up direction, and the spool is turned in the pull-out direction when the webbing is pulled out from the spool. The regulating member of the regulation unit turns together with the spool.

In the predetermined situation, the regulation unit regulates turning of the regulating member in the pull-out direction, and the force limiter mechanism allows turning of the spool in the pull-out direction relative to the regulating member by the load at least the force limiter load. This force limiter load can be switched by the activation unit being activated.

The turning member is provided at the pretensioner mechanism. When the pretensioner mechanism turns the turning member in the take-up direction in the predetermined situation, the spool is turned in the take-up direction.

When the pretensioner mechanism is turning the turning member in the take-up direction, the allowing unit allows the turning member to turn in the take-up direction relative to the spool by a predetermined turning amount. The activation unit is activated as a result of the turning of the turning member in the take-up direction relative to the spool, which is allowed by the allowing unit. Therefore, the activation unit may be activated without the force limiter mechanism allowing turning of the regulating member in the take-up direction relative to the spool.

In the webbing take-up device according to the second aspect of the present invention, the activation unit is activated by the turning of the spool in the pull-out direction relative to the regulating member, which is allowed by the force limiter mechanism. Therefore, the activation unit may be activated even if it occurs that the pretensioner mechanism does not turn the turning member in the take-up direction.

In the webbing take-up device according to the third aspect of the present invention, the activating body of the activation unit is connected to at least one of the turning member side or the spool side thereof. When the allowing unit allows the turning of the turning member in the take-up direction relative to the spool, the connection of the activating body to at least one of the turning member side or the spool side is released and the activating body is moved, thus activating the activation unit. Therefore, the activation unit may be activated by the turning of the turning member in the take-up direction relative to the spool, which is allowed by the allowing unit.

In the webbing take-up device according to the fourth aspect of the present invention, when the force limiter mechanism allows the turning of the spool in the pull-out direction relative to the regulating member, movement of the activating body is allowed by the turning member, the connection of the activating body with the spool side is released, and the activating body is moved. Thus, the activation unit is activated. Therefore, the activation unit may be activated by the turning of the spool in the pull-out direction relative to the regulating member, which is allowed by the force limiter mechanism.

DESCRIPTION OF EMBODIMENTS

—First Exemplary Embodiment—

Figure 1:
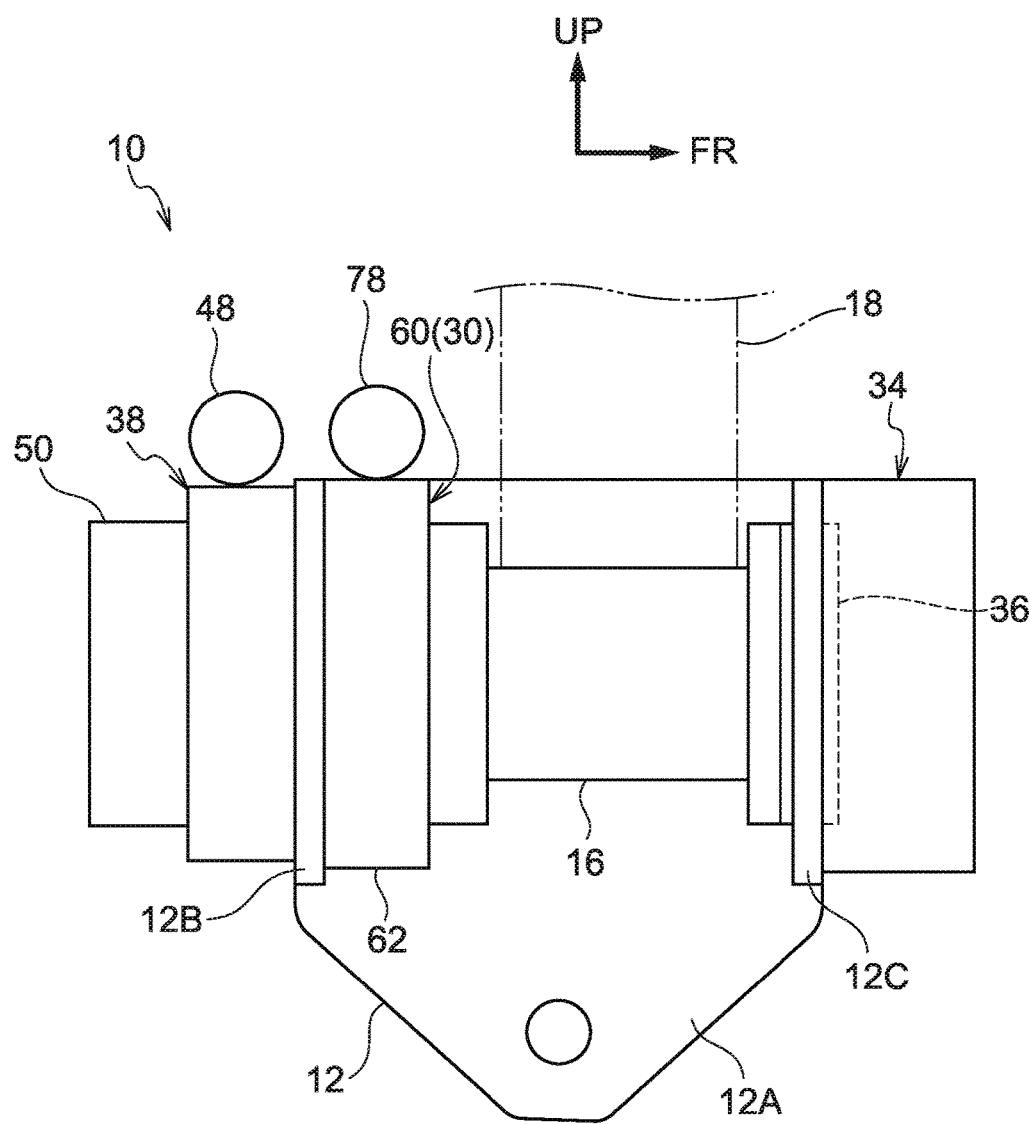
FIG. 1 is a front view in which a webbing take-up device in accordance with a first exemplary embodiment of the present invention is viewed from the front.
Figure 2:
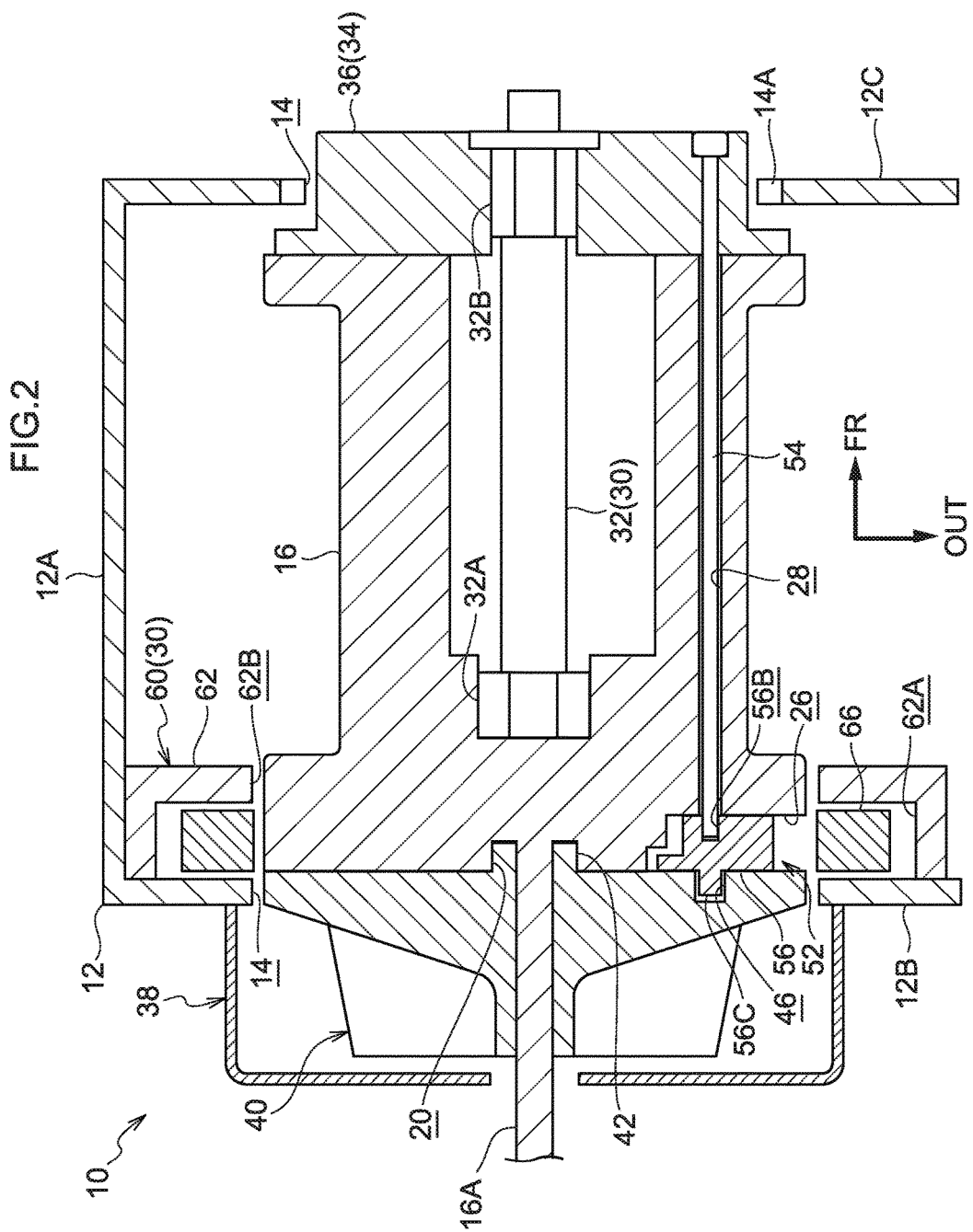
FIG. 2 is a sectional view in which principal portions of the webbing take-up device in accordance with the first exemplary embodiment of the present invention are viewed from above.

FIG. 1 shows a front view in which a webbing take-up device 10 according to a first exemplary embodiment of the present invention is viewed from the front, and FIG. 2 shows a sectional view in which principal portions of the webbing take-up device 10 are viewed from above. In the drawings, one way (for example, the vehicle front) in the vehicle front-and-rear direction is indicated by arrow FR, outward in the vehicle width direction is indicated by arrow OUT, and upward is indicated by arrow UP.

The webbing take-up device 10 according to the present exemplary embodiment is disposed in a vehicle. The front, one side and upper side of the webbing take-up device 10 are oriented, respectively, outward in the vehicle width direction, the other way in the vehicle front-and-rear direction (for example, the vehicle rear) and upward.

As shown in FIG. 1 and FIG. 2, the webbing take-up device 10 is provided with a frame 12 in a plate shape with a "U" shape in cross section. The frame 12 serves as a support member. The frame 12 is provided with a rear plate 12A at the rear, a leg plate 12B at one side, and a leg plate 12C at another side. The webbing take-up device 10 is disposed in the vehicle by the rear plate 12A of the frame 12 being fixed to the vehicle body. Substantially circular penetrating holes 14 are formed in the leg plate 12B and the leg plate 12C. The penetrating holes 14 in the leg plate 12B and the leg plate 12C are disposed to be coaxial. First ratchet teeth 14A (inward teeth) are formed over the whole circumference of the penetrating hole 14 of the leg plate 12C.

Figure 3:
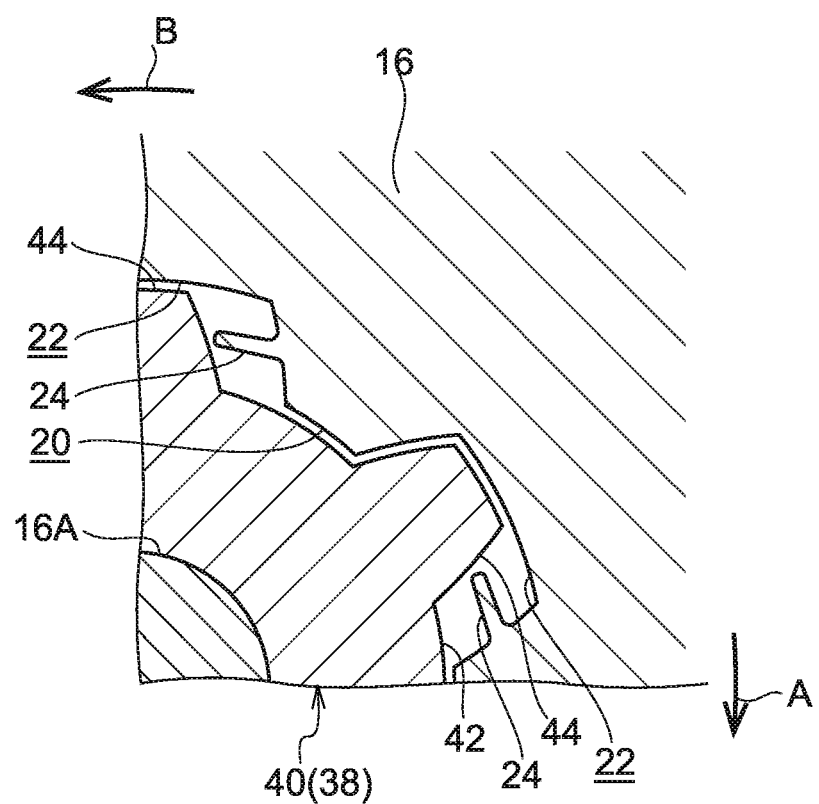
FIG. 3 is a sectional view showing a spool and a pinion of the webbing take-up device in accordance with the first exemplary embodiment of the present invention, viewed from another side.

A spool 16 is turnably supported between the leg plate 12B and leg plate 12C of the frame 12. The spool 16 has the shape of a substantially circular tube with a floor. Thus, a face inside the spool 16 at the side at which the leg plate 12B is disposed is closed off. A webbing 18 in a long, narrow belt shape is wound onto the spool 16 from a length direction proximal end side of the webbing 18. The webbing 18 is taken up onto the spool 16 by the spool 16 being turned in a take-up direction (the direction of arrow A in FIG. 3 and the like). The spool 16 is turned in a pull-out direction (the direction of arrow B in FIG. 3 and the like) by the webbing 18 being pulled out from the spool 16. The webbing 18 is pulled out from the spool 16 and hence the webbing 18 is applied to a vehicle occupant sitting on a seat of the vehicle.

A circular rod-shaped support shaft 16A is integrally provided at the side of the spool 16 at which the leg plate 12B is disposed. The support shaft 16A protrudes coaxially from the spool 16 at the side at which the leg plate 12B is disposed, and the support shaft 16A coaxially penetrates through the penetrating hole 14 of the leg plate 12B. In a face of the spool 16 at the side at which the leg plate 12B is disposed, an annular accommodation recess portion 20 is formed coaxially with the support shaft 16A at the diametric direction outer side of the support shaft 16A. The accommodation recess portion 20 is open to the side of the spool 16 at which the leg plate 12B is disposed. A predetermined number of engaging recess portions 22 in substantially rectangular shapes (see FIG. 3) are formed in the face at the side of the spool 16 at which the leg plate 12B is disposed, at the diametric direction outer side of the accommodation recess portion 20. The engaging recess portions 22 are open to the side of the spool 16 at which the leg plate 12B is disposed. The engaging recess portions 22 are in communication with the accommodation recess portion 20. The predetermined number of the engaging recess portions 22 are disposed to be equally spaced in the circumferential direction of the accommodation recess portion 20. Inside each engaging recess portion 22, an allowing portion 24 (see FIG. 3) in a long, narrow, rectangular plate shape is provided. The allowing portions 24 serve as an allowing unit. One width direction end of each allowing portion 24 is integral with a floor face of the engaging recess portion 22. A length direction proximal end of the allowing portion 24 is integral with a face at the take-up direction side of the engaging recess portion 22. The allowing portion 24 protrudes in the pull-out direction toward the length direction distal end side thereof.

An accommodation hole 26 is formed in an end portion of the spool 16 at the side at which the leg plate 12B is disposed. The accommodation hole 26 is open to the side of the spool 16 at which the leg plate 12B is disposed and to the diametric direction outer side. A circular communicating hole 28 is formed penetrating through a peripheral portion of the spool 16. The communicating hole 28 extends in parallel with the axial direction of the spool 16 and communicates with the accommodation hole 26.

A substantially circular rod-shaped torsion shaft 32 fabricated of metal is provided coaxially inside the spool 16. The torsion shaft 32 structures a force limiter mechanism 30 and serves as a first energy absorbing member (a first force limiter mechanism). One end portion 32A of the torsion shaft 32, at the side at which the leg plate 12B is disposed, is integrally turnably joined to the spool 16. Another end portion 32B of the torsion shaft 32, at the side at which the leg plate 12C is disposed, protrudes from the side of the spool 16 at which the leg plate 12C is disposed. The another end portion 32B is disposed in the penetrating hole 14 of the leg plate 12C.

A lock mechanism 34 that serves as a regulation unit is provided at the outer side of the leg plate 12C of the frame 12. A substantially circular plate-shaped lock base 36 that serves as a regulating member is provided at the lock mechanism 34. The lock base 36 is disposed coaxially in the penetrating hole 14 of the leg plate 12C and is disposed to be coaxial with the torsion shaft 32. The another end portion 32B of the torsion shaft 32 is integrally turnably joined to the lock base 36. Thus, the spool 16, the torsion shaft 32 and the lock base 36 are turnably integrated.

A lock plate (not shown in the drawings) is provided at the lock base 36. Plate teeth are formed at the lock plate. During an emergency state of the vehicle (a predetermined situation such as a time of collision of the vehicle (when there is a sudden deceleration of the vehicle or when the webbing 18 is suddenly pulled out from the spool 16) or the like), the lock mechanism 34 is activated and the lock plate is moved relative to the lock base 36. As a result, the plate teeth of the lock plate mesh with the first ratchet teeth 14A of the leg plate 12C of the frame 12, regulating (locking) turning of the lock base 36 in the pull-out direction (but allowing turning of the lock base 36 in the take-up direction).

A pretensioner mechanism 38 is provided at the outer side of the leg plate 12B of the frame 12. A pinion 40 that serves as a turning member is provided at the pretensioner mechanism 38. The support shaft 16A of the spool 16 is coaxially inserted into the pinion 40. Thus, the pinion 40 is supported at the support shaft 16A.

An accommodation protrusion portion 42 is formed at a face of the pinion 40 at the side at which the spool 16 is disposed, coaxially at the diametric direction outer side of the support shaft 16A. The accommodation protrusion portion 42 protrudes from the pinion 40 to the side at which the spool 16 is disposed and is accommodated (fitted) in the accommodation recess portion 20 of the spool 16. A predetermined number of engaging protrusion portions 44 in substantially rectangular shapes (see FIG. 3) are formed at the diametric direction outer side of the accommodation protrusion portion 42, at the face of the pinion 40 at the side at which the spool 16 is disposed. The engaging protrusion portions 44 protrude from the pinion 40 toward the side at which the spool 16 is disposed. The predetermined number of engaging protrusion portions 44 are disposed to be equally spaced in the circumferential direction of the accommodation protrusion portion 42. Each engaging protrusion portion 44 is accommodated in one of the engaging recess portions 22 of the spool 16, between a face at the pull-out direction side of the engaging recess portion 22 and the length direction distal end of the allowing portion 24. Therefore, when the faces at the pull-out direction sides of the engaging protrusion portions 44 engage with the faces at the pull-out direction sides of the engaging recess portions 22, the spool 16 and the pinion 40 turn integrally in the pull-out direction, and when the faces at the take-up direction sides of the engaging protrusion portions 44 engage with the length direction distal ends of the allowing portions 24, the spool 16 and the pinion 40 turn integrally in the take-up direction.

Figure 4:
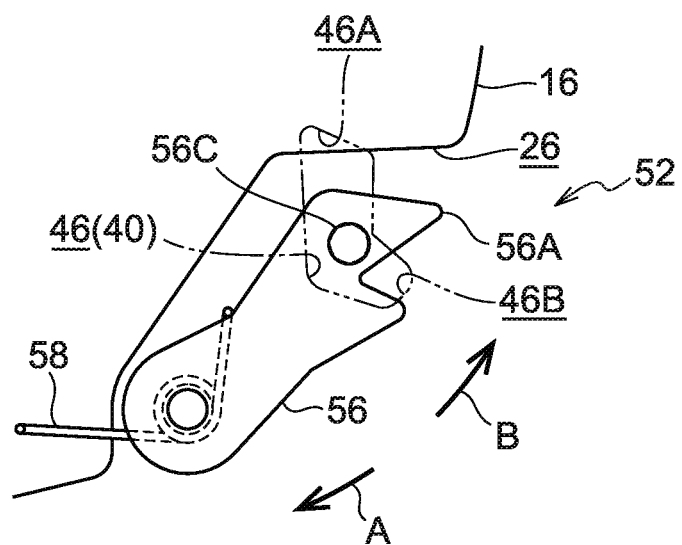
FIG. 4 is a side view showing a lock pawl and the like of the webbing take-up device in accordance with the first exemplary embodiment of the present invention, viewed from one side.

A long, narrow guide hole 46 (see FIG. 4) is formed in the face of the pinion 40 at the side at which the spool 16 is disposed. The guide hole 46 is open to the side at which the spool 16 is disposed. A middle portion of the guide hole 46 is inflected. One side portion 46A of the guide hole 46 (a region at the diametric direction inner side of the pinion 40) extends in a direction toward the diametric direction inner side of the pinion 40 toward the pull-out direction, and another side portion 46B of the guide hole 46 (a region at the diametric direction outer side of the pinion 40) extends to the diametric direction outer side of the pinion 40.

A first gas generator 48 is provided at the pretensioner mechanism 38. The first gas generator 48 is electronically connected to a control device of the vehicle (not shown in the drawings). During an emergency state of the vehicle (a predetermined situation such as a time of collision of the vehicle (when a collision of the vehicle is detected) or the like), the pretensioner mechanism 38 is activated by control from the control device and the first gas generator 48 momentarily produces high-pressure gas. As a result, the pinion 40 is rapidly turned in the take-up direction with a high load by the pressure of the gas.

An urging mechanism 50 is provided at the opposite side of the pretensioner mechanism 38 from the side at which the frame 12 is disposed. A spiral spring (not shown in the drawings) that serves as an urger is provided at the urging mechanism 50. A diametric direction inner side end of the spiral spring is joined to the support shaft 16A of the spool 16. The spiral spring urges the spool 16 in the take-up direction and thus urges the webbing 18 in the take-up direction onto the spool 16.

An activation mechanism 52 that serves as an activation unit is provided from the spool 16 to the lock base 36.

A long, narrow, rod-shaped trigger wire 54 fabricated of metal is provided in the activation mechanism 52. The trigger wire 54 serves as a connecting member. The trigger wire 54 is inserted into the communicating hole 28 in the spool 16. A proximate end of the trigger wire 54 is joined to the lock base 36 and a distal end portion of the trigger wire 54 is inserted into the accommodation hole 26 of the spool 16.

A plate-shaped lock pawl 56 (see FIG. 4) that serves as an activating body (an activation member) is turnably supported, at a proximal end portion thereof, inside the accommodation hole 26 of the spool 16. A pawl tooth 56A is formed at a distal end of the lock pawl 56. An activation spring 58 (a torsion coil spring) that serves as an urging member is braced between the spool 16 and the lock pawl 56. The activation spring 58 urges the lock pawl 56 in a direction in which the pawl tooth 56A turns to the diametric direction outer side of the spool 16. A circular anchoring hole 56B is formed in a distal end portion of the lock pawl 56. The anchoring hole 56B is open to the side at which the spool 16 is disposed. The distal end portion of the trigger wire 54 is inserted into (connected at) the anchoring hole 56B. The trigger wire 54 stops turning of the lock pawl 56. A circular rod-shaped lock pin 56C that serves as a connection portion is provided at the distal end portion of the lock pawl 56. The lock pin 56C protrudes to the side at which the pinion 40 is disposed and is inserted into (connected at) the inflected portion of the guide hole 46 of the pinion 40. The lock pin 56C has a higher shear strength than the trigger wire 54.

A second force limiter mechanism 60 (a selectable force limiter mechanism) is provided at the inner side of the leg plate 12B of the frame 12. The second force limiter mechanism 60 structures the force limiter mechanism 30.

Figure 7:
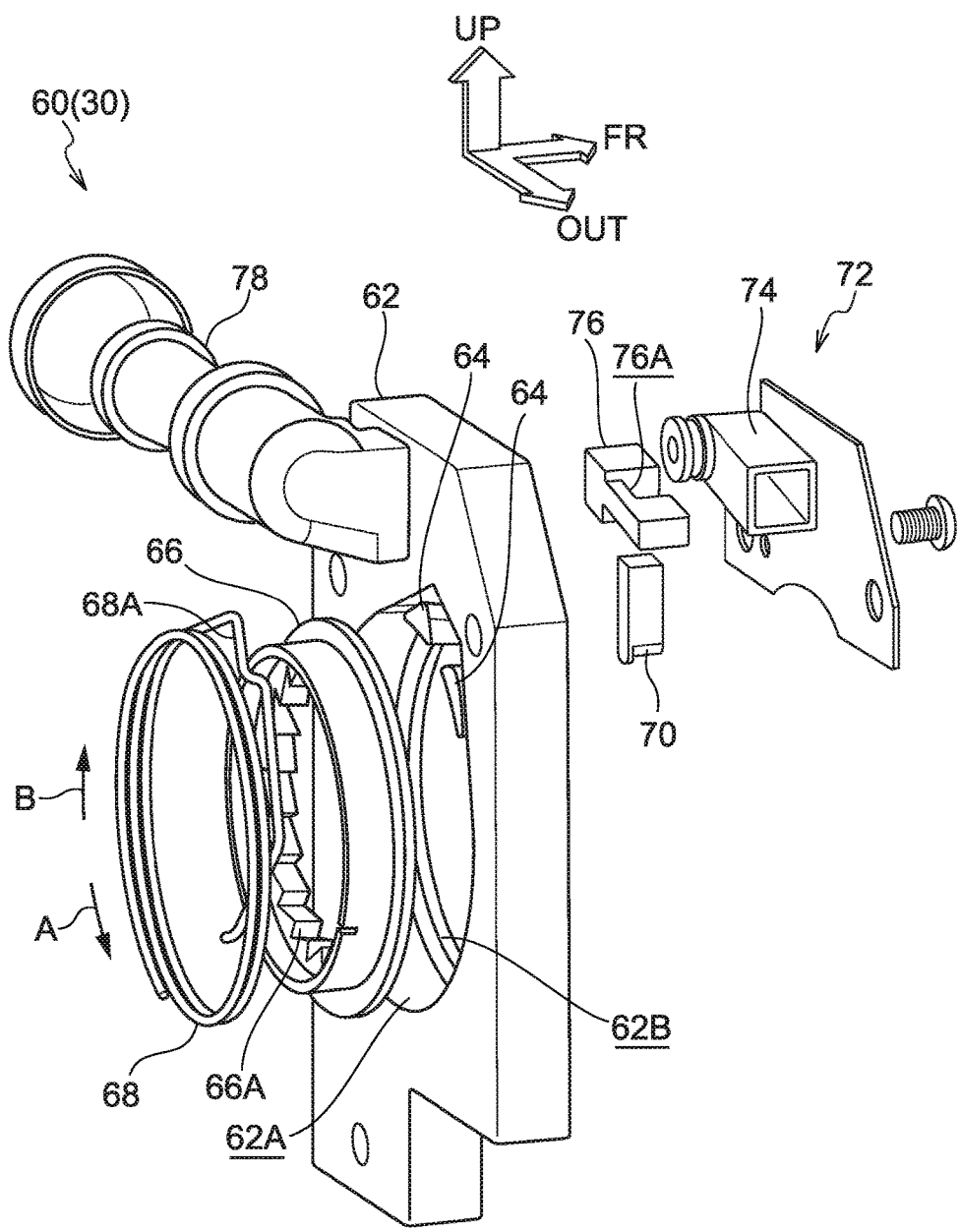
FIG. 7 is an exploded perspective view showing a second force limiter mechanism of the webbing take-up device in accordance with the first exemplary embodiment of the present invention, viewed from the front side.

As shown in FIG. 7, a substantially cuboid body 62 is provided at the second force limiter mechanism 60. The body 62 is fixed to the leg plate 12B. A substantially circular recess portion 62A is formed at a central portion of the body 62. The recess portion 62A opens to the side at which the leg plate 12B is disposed. A circular disposition hole 62B is formed penetrating through a floor wall of the recess portion 62A, substantially coaxially therewith. An end portion of the spool 16 at the side at which the leg plate 12B is disposed is coaxially inserted into the disposition hole 62B.

A pair of squeezing rods 64 in substantially triangular column shapes are integrally formed at an upper portion of the floor wall of the recess portion 62A to serve as deforming portions. The pair of squeezing rods 64 protrude from the floor wall of the recess portion 62A to the side at which the leg plate 12B is disposed and are spaced apart from one another in the circumferential direction of the recess portion 62A. Upper side faces of the squeezing rods 64 are curved in shapes protruding to the upper side.

A substantially tubular lock ring 66 is turnably supported inside the recess portion 62A at the lower side of the pair of squeezing rods 64. An end portion of the spool 16 at the side at which the leg plate 12B is disposed (including the accommodation hole 26) is coaxially inserted into the lock ring 66. Second ratchet teeth 66A (inward teeth) are formed at an inner periphery portion of the lock ring 66 over the whole circumference thereof.

A long, narrow rod-shaped wire 68 fabricated of metal is wound onto an outer periphery face of the lock ring 66 to serve as a second energy absorbing member. One end portion of the wire 68 is anchored to the lock ring 66. A squeezed portion 68A is formed in a vicinity of the one end portion of the wire 68. The squeezed portion 68A is formed to be bent toward the diametric direction inner side of the wire 68 in a substantial "V" shape. Two length direction end portions of the squeezed portion 68A are placed on the respective upper sides of the squeezing rods 64 of the body 62 (see FIG. 8).

A substantially rectangular rod-shaped slider 70 that serves as a switching member is supported at an upper portion of the body 62. The slider 70 is slidable in the vertical direction. A lower face of the slider 70 is curved in a shape protruding to the lower side. The lower face of the slider 70 is placed on the upper side of the squeezed portion 68A of the wire 68 (see FIG. 8).

A switching mechanism 72 that serves as a switching unit is provided at an upper portion of the body 62, at the side of the slider 70 at which the rear plate 12A is disposed.

A cylinder 74 in the shape of a substantially rectangular tube with a floor is provided at the switching mechanism 72. The cylinder 74 is fixed to an upper portion of the body 62. The cylinder 74 is disposed such that an axial direction thereof is horizontal. A proximal end of the cylinder 74 at the side at which the rear plate 12A is disposed is closed off.

A piston 76 with a substantially rectangular rod shape is inserted into the cylinder 74. Sealing is implemented between a proximal end portion of the piston 76 and inner periphery faces of the cylinder 74. The piston 76 protrudes from the distal end of the cylinder 74 to the opposite side thereof from the side at which the rear plate 12A is disposed. A distal end portion of the piston 76 is disposed at the upper side of the slider 70 and stops sliding of the slider 70 to the upper side (see FIG. 8). A switching hole 76A with a rectangular shape is formed penetrating through an axial direction central portion of the piston 76. The switching hole 76A is open to the side at which the leg plate 12C is disposed.

Figure 9:
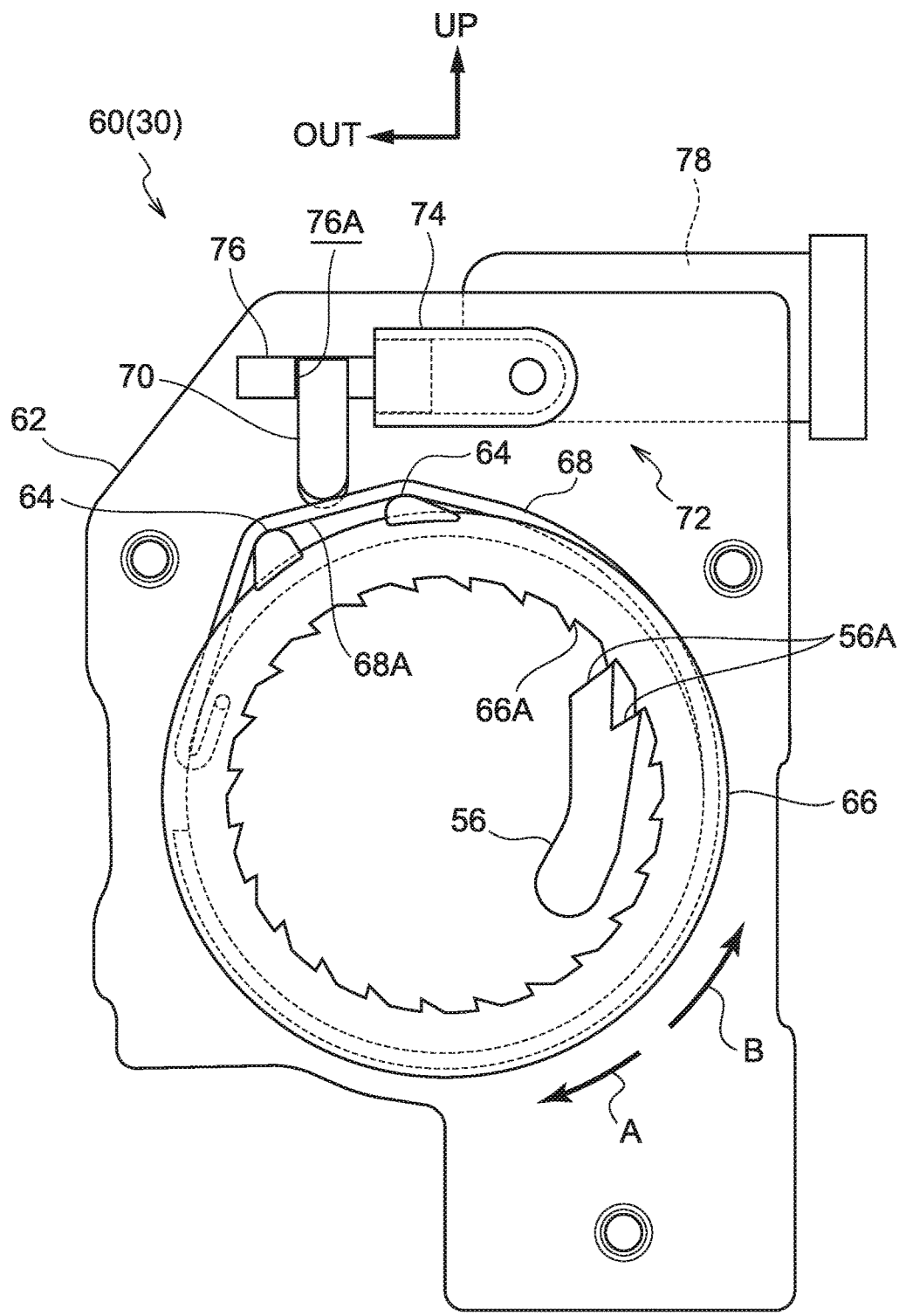
FIG. 9 is a side view depicting a time of switching of a force limiter load by the second force limiter mechanism of the webbing take-up device in accordance with the first exemplary embodiment of the present invention, viewed from the other side.

A second gas generator 78 is in fluid communication with the interior of a proximal end portion of the cylinder 74. The second gas generator 78 is electronically connected to the control device of the vehicle (not shown in the drawings). The switching mechanism 72 can be activated by control from the control device. When the switching mechanism 72 is activated, the second gas generator 78 momentarily produces high-pressure gas and supplies the gas into the proximal end portion of the cylinder 74. As a result, the piston 76 is momentarily moved toward the distal end side by the pressure of the gas and the switching hole 76A of the piston 76 is disposed at the upper side of the slider 70 (see FIG. 9).

A physical build detector (not shown in the drawings) is electronically connected to the control device. The physical build detector detects the build of a vehicle occupant to whom the webbing 18 is applied from at least one of: a load that acts on the seat on which the vehicle occupant to whom the webbing 18 is applied is sitting; a pull-out amount from the spool 16 of the webbing 18 applied to the vehicle occupant; or a vehicle front-and-rear direction position of the seat on which the vehicle occupant to whom the webbing 18 is applied is sitting. If the build of a vehicle occupant is less than a pre-specified standard value, the physical build detector determines that the vehicle occupant has a small body, and if the build of a vehicle occupant is equal to or greater than the pre-specified standard value, the physical build detector determines that the vehicle occupant has a large body.

During an emergency state of the vehicle (a predetermined situation such as a time of collision of the vehicle (when a collision of the vehicle is detected) or the like), the switching mechanism 72 is activated by control from the control device if the physical build detector has detected that the build of the vehicle occupant is less than the standard value.

Now, operation of the present exemplary embodiment is described.

In the webbing take-up device 10 with the structure described above, the webbing 18 is pulled out from the spool 16 and the webbing 18 is applied to a vehicle occupant. The webbing 18 is taken up onto the spool 16 by the urging force of the spiral spring of the urging mechanism 50. Thus, slackness of the webbing 18 that has been applied to the vehicle occupant is eliminated.

During an emergency state of the vehicle, the lock mechanism 34 is activated and the lock plate is moved relative to the lock base 36. As a result, the plate teeth of the lock plate are meshed with the first ratchet teeth 14A of the leg plate 12C of the frame 12, and turning of the lock base 36 in the pull-out direction is regulated. Thus, turning of the spool 16 in the pull-out direction is limited, and pulling out of the webbing 18 from the spool 16 is limited. Therefore, the vehicle occupant is restrained by the webbing 18.

During the emergency state of the vehicle, the pretensioner mechanism 38 is activated by control from the control device and the first gas generator 48 momentarily produces high-pressure gas. As a result, the pinion 40 is rapidly turned in the take-up direction with a high load by the pressure of the gas. Consequently, each engaging protrusion portion 44 of the pinion 40 deforms (such as by shearing) the allowing portion 24 in the corresponding engaging recess portion 22 of the spool 16. Thus, turning of the pinion 40 relative to the spool 16 by a predetermined turning amount in the take-up direction is allowed, after which the engaging protrusion portions 44 of the pinion 40 engage (interfere) with the surfaces at the take-up direction sides of the engaging recess portions 22 of the spool 16, and the pinion 40 rapidly turns the spool 16 in the take-up direction with the high load. Therefore, the webbing 18 is rapidly taken up onto the spool 16 with a high load and a restraining force on the vehicle occupant from the webbing 18 is increased.

Further, during the emergency state of the vehicle, if the physical build detector has detected that the build of the vehicle occupant is less than the standard value (if the vehicle occupant has a small body), then the switching mechanism 72 at the second force limiter mechanism 60 of the force limiter mechanism 30 is activated by control from the control device and the second gas generator 78 momentarily produces high-pressure gas. Consequently, the piston 76 is momentarily moved toward the distal end side by the pressure of the gas and the switching hole 76A of the piston 76 is disposed at the upper side of the slider 70. Thus, sliding of the slider 70 to the upper side is allowed (see FIG. 9). Alternatively, if the physical build detector has detected that the build of the vehicle occupant is at least the standard value, then the switching mechanism 72 is not activated during the emergency state of the vehicle and the distal end portion of the piston 76 stays disposed at the upper side of the slider 70. Thus, sliding of the slider 70 to the upper side is stopped (see FIG. 8).

Figure 5A:
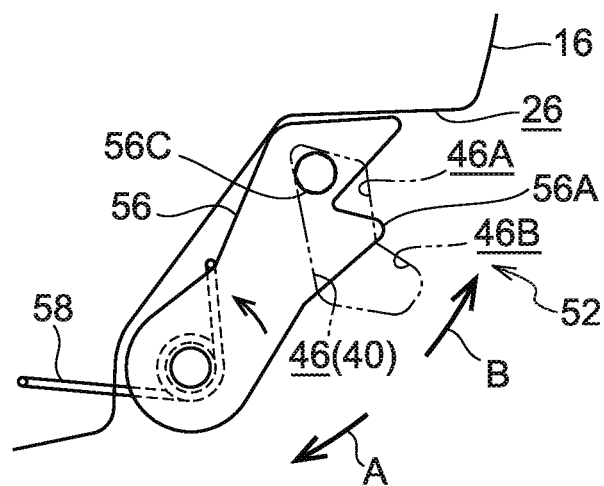
FIG. 5A is a side view showing the lock pawl and the like at a first operational stage of a pretensioner mechanism of the webbing take-up device in accordance with the first exemplary embodiment of the present invention, viewed from the one side.
Figure 5B:
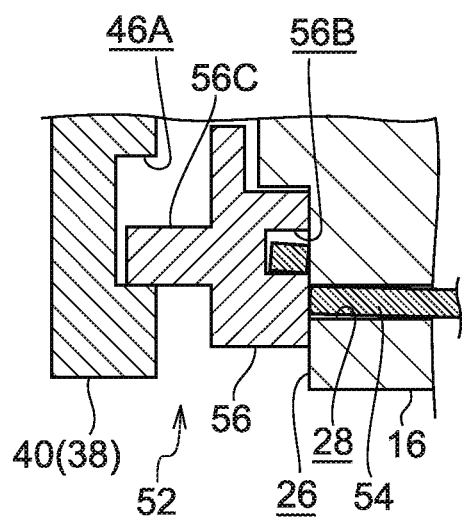
FIG. 5B is a sectional view showing the lock pawl and the like at the first operational stage of the pretensioner mechanism of the webbing take-up device in accordance with the first exemplary embodiment of the present invention.
Figure 6:
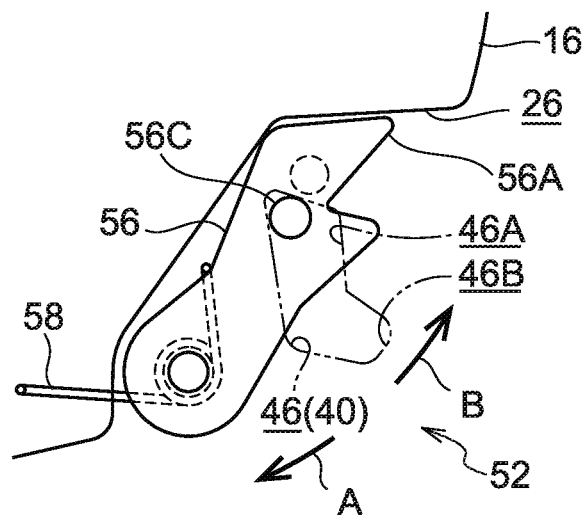
FIG. 6 is a side view showing the lock pawl and the like at a second operational stage of the pretensioner mechanism of the webbing take-up device in accordance with the first exemplary embodiment of the present invention, viewed from the one side.

When the pretensioner mechanism 38 is activated and the turning of the pinion 40 in the take-up direction relative to the spool 16 is allowed as described above, then as shown in FIG. 5A and FIG. 5B, the guide hole 46 of the pinion 40 turns in the take-up direction relative to the lock pawl 56 of the spool 16, and the lock pin 56C of the lock pawl 56 is guided by a periphery face of the one side portion 46A of the guide hole 46. Therefore, the lock pawl 56 is turned toward the diametric direction inner side of the spool 16 against the urging force of the activation spring 58, and a distal end portion of the trigger wire 54 of the spool 16 is sheared off by a periphery face of the anchoring hole 56B of the lock pawl 56. Hence, further turning of the pinion 40 in the take-up direction relative to the spool 16 is allowed and, as shown in FIG. 6, the guide hole 46 turns further in the take-up direction relative to the lock pawl 56. As a result, the lock pin 56C of the lock pawl 56 is sheared off by the periphery face of the one side portion 46A of the guide hole 46. In consequence, the lock pawl 56 is allowed to turn toward the diametric direction outer side of the spool 16, the lock pawl 56 is turned toward the diametric direction outer side of the spool 16 by the urging force of the activation spring 58, and the pawl tooth 56A of the lock pawl 56 is meshed with the second ratchet teeth 66A of the lock ring 66 of the second force limiter mechanism 60. In this manner, the activation mechanism 52 is activated and the lock ring 66 is made turnable in the pull-out direction integrally with the spool 16 (although turning of the spool 16 relative to the lock ring 66 in the take-up direction is allowed). Hence, when the lock ring 66 is turning in the pull-out direction integrally with the spool 16, the wire 68 of the second force limiter mechanism 60 turns in the pull-out direction integrally with the lock ring 66, and the wire 68 successively passes through the locations of the pair of squeezing rods 64 and the slider 70.

Figure 8:
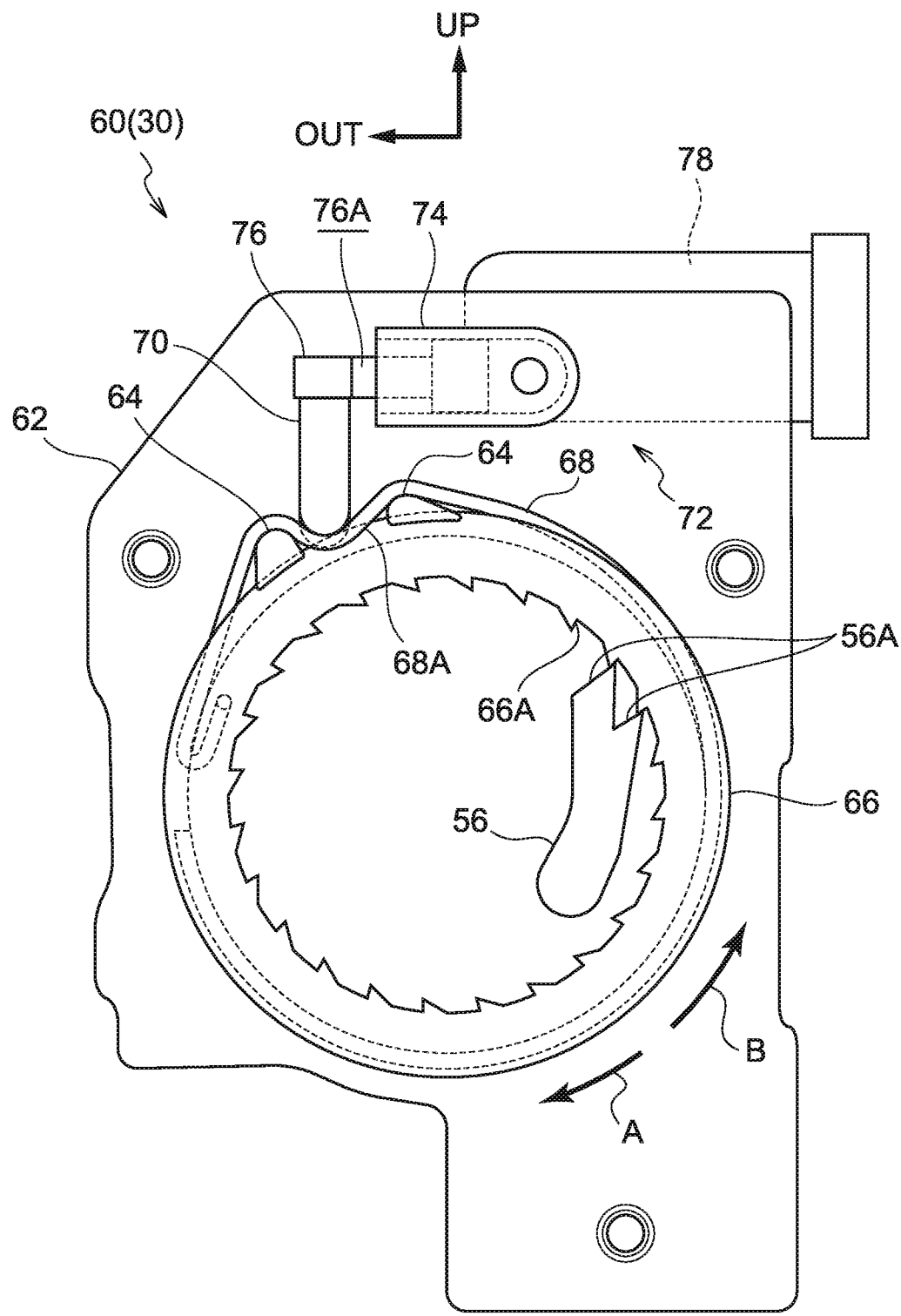
FIG. 8 is a side view showing the second force limiter mechanism of the webbing take-up device in accordance with the first exemplary embodiment of the present invention, viewed from the other side.

If, as described above, the physical build detector has detected that the build of the vehicle occupant is at least the standard value (that the vehicle occupant has a large body) and sliding of the slider 70 to the upper side is stopped, then when the wire 68 is turned in the pull-out direction integrally with the lock ring 66, the wire 68 is successively deformed by squeezing by the pair of squeezing rods 64 and the slider 70 (see FIG. 8).

Therefore, in this case, when a turning load in the pull-out direction of the spool 16 due to the webbing 18 being pulled on by the vehicle occupant is equal to or greater than a total load of a twisting yield load (deformation yield load) of the torsion shaft 32 of the force limiter mechanism 30 and a squeezing yield load (deformation yield load) of the wire 68 from the pair of squeezing rods 64 and the slider 70, the torsion shaft 32 is deformed by twisting and the wire 68 is deformed by squeezing by the pair of squeezing rods 64 and the slider 70. Thus, turning of the spool 16 and the lock ring 66 in the pull-out direction relative to the lock base 36 is allowed. Therefore, in the situation in which a force limiter load at which turning of the spool 16 in the pull-out direction is allowed is set to a high load—the total of the twisting yield load of the torsion shaft 32 and the squeezing yield load of the wire 68 by the pair of squeezing rods 64 and the slider 70—kinetic energy of the vehicle occupant is absorbed by the twisting deformation of the torsion shaft 32 and the squeezing deformation of the wire 68 by the pair of squeezing rods 64 and the slider 70. Thus, a load acting on the vehicle occupant from the webbing 18 is moderated. Therefore, a vehicle occupant with a large body may be protected effectively.

On the other hand, if, as described above, the physical build detector has detected that the build of the vehicle occupant is less than the standard value (that the vehicle occupant has a small body) and sliding of the slider 70 to the upper side is allowed, then when the wire 68 is turning in the pull-out direction integrally with the lock ring 66, the slider 70 is slid to the upper side by the wire 68 and the slider 70 does not deform the wire 68 by squeezing. Therefore, the wire 68 is successively deformed by squeezing only by the pair of squeezing rods 64 (see FIG. 9).

Therefore, in this case, when a turning load in the pull-out direction of the spool 16 due to the webbing 18 being pulled on by the vehicle occupant is equal to or greater than the twisting yield load (deformation yield load) of the torsion shaft 32 of the force limiter mechanism 30 and a squeezing yield load (deformation yield load) of the wire 68 from the pair of squeezing rods 64, the torsion shaft 32 is deformed by twisting and the wire 68 is deformed by squeezing by the pair of squeezing rods 64. Thus, turning of the spool 16 and the lock ring 66 in the pull-out direction relative to the lock base 36 is allowed. Therefore, in the situation in which the force limiter load at which turning of the spool 16 in the pull-out direction is allowed is set to a low load—the total of the twisting yield load of the torsion shaft 32 and the squeezing yield load of the wire 68 by the pair of squeezing rods 64—kinetic energy of the vehicle occupant is absorbed by the twisting deformation of the torsion shaft 32 and the squeezing deformation of the wire 68 by the pair of squeezing rods 64. Thus, a load acting on the vehicle occupant from the webbing 18 is moderated. Therefore, a vehicle occupant with a small body may be protected effectively.

If it occurs that the pretensioner mechanism 38 is not activated during an emergency state of the vehicle, then when a turning load in the pull-out direction of the spool 16 due to the webbing 18 being pulled on by the vehicle occupant is equal to or greater than the twisting yield load (deformation yield load) of the torsion shaft 32 of the force limiter mechanism 30, the torsion shaft 32 is deformed by twisting, and turning of the spool 16 in the pull-out direction relative to the lock base 36 is allowed. As a result, the trigger wire 54 is pulled out by the lock base 36 from the communicating hole 28 toward the side at which the lock base 36 is disposed, and the insertion of the distal end portion of the trigger wire 54 into the anchoring hole 56B of the lock pawl 56 is disengaged. Hence, turning of the lock pin 56C of the lock pawl 56 due to turning of the lock pawl 56 toward the diametric direction outer side of the spool 16 is allowed by the other side portion 46B of the guide hole 46 of the pinion 40. Accordingly, the lock pawl 56 is turned to the diametric direction outer side of the spool 16 by the urging force of the activation spring 58, and the pawl tooth 56A of the lock pawl 56 is meshed with the second ratchet teeth 66A of the lock ring 66. Thus, the activation mechanism 52 is activated and the lock ring 66 is made turnable in the pull-out direction integrally with the spool 16. Therefore, the force limiter load at which the turning of the spool 16 in the pull-out direction as described above is allowed is switchable between the high load and the low load.

As described above, when the pretensioner mechanism 38 is activated, the activation mechanism 52 is activated by the allowing portion 24 of the spool 16 allowing turning of the pinion 40 relative to the spool 16 by a predetermined turning amount in the take-up direction. Therefore, the activation mechanism 52 may be activated and the force limiter load can be switched between the high load and the low load even without the torsion shaft 32 of the force limiter mechanism 30 allowing turning of the lock base 36 in the take-up direction relative to the spool 16 (i.e., turning of the spool 16 in the pull-out direction relative to the lock base 36). Therefore, the activation mechanism 52 may be activated even without the torsion shaft 32 being deformed by twisting. Thus, a number of possible times of twisting deformation of the torsion shaft 32 for absorbing kinetic energy of a vehicle occupant may be increased, and the torsion shaft 32 may absorb the kinetic energy of the vehicle occupant effectively.

As described above, the activation mechanism 52 can be activated by the torsion shaft 32 of the force limiter mechanism 30 allowing turning of the spool 16 in the pull-out direction relative to the lock base 36. Therefore, even if it occurs that the pretensioner mechanism 38 is not activated, the activation mechanism 52 may be activated and the force limiter load may be switchable between the high load and the low load.

As described above, the activation mechanism 52 can be activated and the force limiter load switched between the high load and the low load by the pretensioner mechanism 38 being activated. Therefore, the force limiter load can be switched between the high load and the low load promptly.

Furthermore, the lock pawl 56 may be turned and the activation mechanism 52 activated by the activation spring 58 alone. Therefore, a number of components of the activation mechanism 52 may be reduced.

—Second Exemplary Embodiment—

Figure 10:
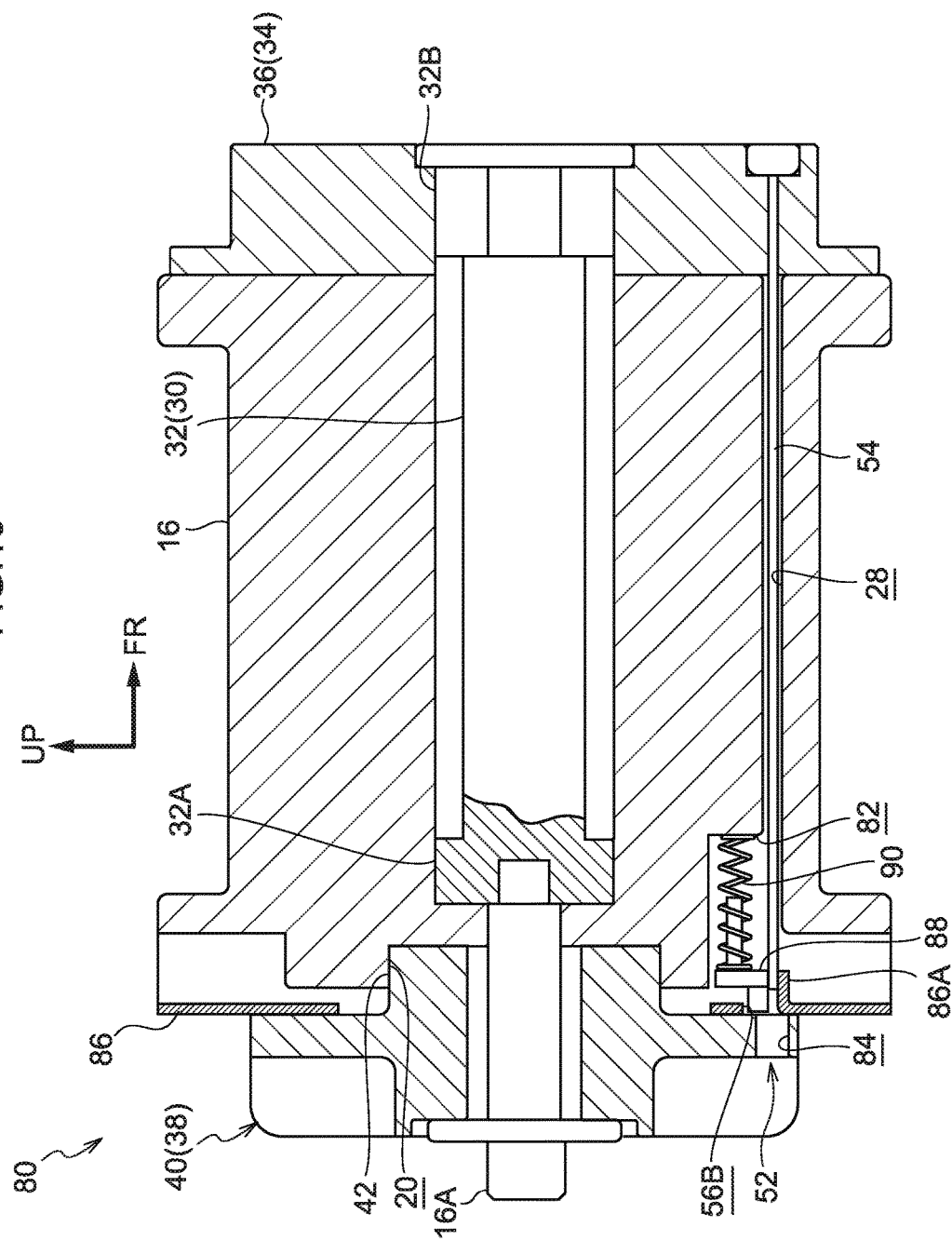
FIG. 10 is a sectional view in which principal portions of a webbing take-up device in accordance with a second exemplary embodiment of the present invention are viewed from the front.

FIG. 10 is a sectional view in which principal portions of a webbing take-up device 80 in accordance with a second exemplary embodiment of the present invention are viewed from the front.

The webbing take-up device 80 according to the present exemplary embodiment has substantially the same structure as the first exemplary embodiment described above but differs in the following respects.

As shown in FIG. 10, in the webbing take-up device 80 according to the present exemplary embodiment, a disposition hole 82 is formed at an end portion of the spool 16 at the side at which the leg plate 12B is disposed, separately from the accommodation hole 26. The disposition hole 82 is open to the side of the spool 16 at which the leg plate 12B is disposed and is in communication with the communicating hole 28 of the spool 16.

A moving hole 84 is formed in a periphery portion of the pinion 40. The moving hole 84 opens at least to the side of the pinion 40 at which the spool 16 is disposed.

At the activation mechanism 52, the trigger wire 54 is inserted into the disposition hole 82 of the spool 16 and a distal end portion of the trigger wire 54 is not inserted into (connected at) the lock pawl 56.

Figure 11:
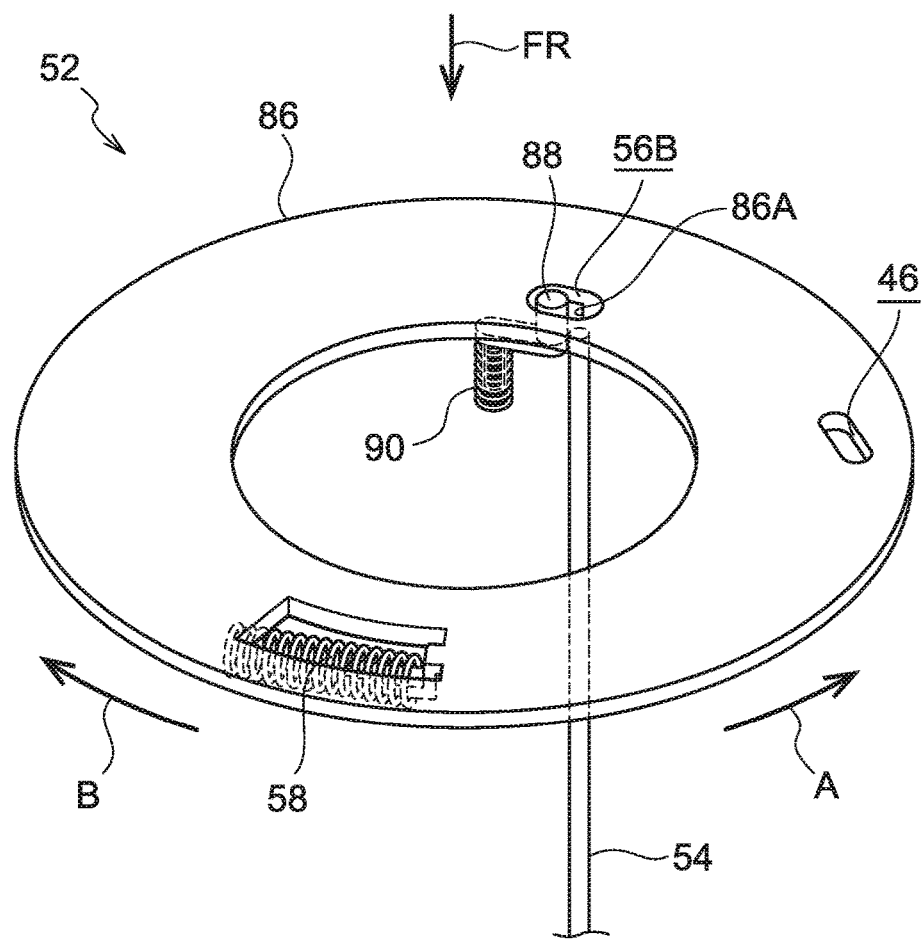
FIG. 11 is a perspective view showing an activation mechanism of the webbing take-up device in accordance with the second exemplary embodiment of the present invention, viewed from the one side.

As shown in FIG. 11, a substantially annular plate-shaped turning plate 86 is provided at the activation mechanism 52 to serve as a moving member that, together with the lock pawl 56, structures the activating body. The turning plate 86 is supported coaxially between the spool 16 and the pinion 40, and the turning plate 86 is turnable. The anchoring hole 56B is formed penetrating through the turning plate 86 instead of through the lock pawl 56. The anchoring hole 56B is narrow and long in the circumferential direction of the turning plate 86. An anchoring wall 86A is provided integrally with the turning plate 86 at a pull-out direction side end portion of the anchoring hole 56B. The anchoring wall 86A protrudes from the turning plate 86 to the side at which the spool 16 is disposed. The activation spring 58 is formed as a compression coil spring and is braced between the spool 16 and the turning plate 86 instead of between the spool 16 and the lock pawl 56. The activation spring 58 urges the turning plate 86 in the take-up direction relative to the spool 16.

A moving rod 88 in a long, narrow, substantial rod shape is disposed in the disposition hole 82 of the spool 16. A distal end side region of the moving rod 88 (a region at the side at which the pinion 40 is disposed) and a proximal end side region of the moving rod 88 (a region at the side at which the spool 16 is disposed) extend in parallel with the axial direction of the spool 16. A middle region of the moving rod 88 extends in the circumferential direction of the spool 16. A movement spring 90 is braced between the middle region of the moving rod 88 and a face of the disposition hole 82 at the side at which the lock base 36 is disposed. The movement spring 90 is a compression coil spring. The proximal end side region of the moving rod 88 is inserted inside the movement spring 90 and the movement spring 90 urges the moving rod 88 toward the side at which the pinion 40 is disposed. The take-up direction side of the moving rod 88 is anchored by the spool 16. Thus, movement of the moving rod 88 to the take-up direction side relative to the spool 16 is stopped by the spool 16.

The distal end side region of the moving rod 88 is inserted into a take-up direction side region of the anchoring hole 56B of the turning plate 86. The distal end side region of the moving rod 88 is abutted against the pinion 40 by the urging force of the movement spring 90. The distal end portion of the trigger wire 54 is disposed between the middle region of the moving rod 88 and the anchoring wall 86A of the turning plate 86. Turning of the turning plate 86 in the take-up direction relative to the spool 16 due to the urging force of the activation spring 58 is stopped by the moving rod 88 and the trigger wire 54.

The guide hole 46 is formed to penetrate through the turning plate 86 instead of through the pinion 40. The guide hole 46 extends in a direction toward the diametric direction outer side of the turning plate 86 toward the pull-out direction. The lock pin 56C of the lock pawl 56 is inserted into a take-up direction side end portion of the guide hole 46.

In an emergency state of the vehicle, when the pretensioner mechanism 38 is activated and turning of the pinion 40 by the predetermined turning amount in the take-up direction relative to the spool 16 is allowed, the moving hole 84 of the pinion 40 is turned in the take-up direction and the distal end side region of the moving rod 88 is inserted into the moving hole 84 by the urging force of the movement spring 90. Thus, the moving rod 88 is no longer disposed at the take-up direction side of the distal end portion of the trigger wire 54. Consequently, while the turning plate 86 is turned in the take-up direction relative to the spool 16 by the urging force of the activation spring 58, the trigger wire 54 is deformed to tilt to the take-up direction side by the anchoring wall 86A of the turning plate 86. As a result, the lock pin 56C of the lock pawl 56 is guided by the guide hole 46 of the turning plate 86 and the lock pawl 56 is turned toward the diametric direction outer side of the turning plate 86. Accordingly, the pawl tooth 56A of the lock pawl 56 of the second force limiter mechanism 60 of the force limiter mechanism 30 is meshed with the second ratchet teeth 66A of the lock ring 66, activating the activation mechanism 52.

If it occurs that the pretensioner mechanism 38 is not activated during an emergency state of the vehicle, then when a turning load in the pull-out direction of the spool 16 due to the webbing 18 being pulled on by the vehicle occupant is equal to or greater than the twisting yield load (deformation yield load) of the torsion shaft 32 of the force limiter mechanism 30, the torsion shaft 32 is deformed by twisting, and turning of the spool 16 in the pull-out direction relative to the lock base 36 is allowed. As a result, the trigger wire 54 is pulled out by the lock base 36 from the communicating hole 28 toward the side at which the lock base 36 is disposed, and the distal end portion of the trigger wire 54 is no longer disposed at the take-up direction side of the anchoring wall 86A of the turning plate 86. Consequently, the turning plate 86 is turned in the take-up direction relative to the spool 16 by the urging force of the activation spring 58, the lock pin 56C of the lock pawl 56 is guided by the guide hole 46 of the turning plate 86, and the lock pawl 56 is turned toward the diametric direction outer side of the turning plate 86. Thus, the pawl tooth 56A of the lock pawl 56 of the second force limiter mechanism 60 of the force limiter mechanism 30 is meshed with the second ratchet teeth 66A of the lock ring 66, activating the activation mechanism 52.

According to the above descriptions, the present exemplary embodiment too may realize the same operations and effects as the above-described first exemplary embodiment, apart from operations and effects due to the lock pawl 56 being turned by the activation spring 58 alone.

In the first exemplary embodiment and second exemplary embodiment described above, the allowing portion 24 is provided at the spool 16. However, it is sufficient that the allowing portion 24 be provided at least one of the spool 16 or the pinion 40.

In the first exemplary embodiment and second exemplary embodiment described above, The pinion 40 deforms the allowing portions 24 of the spool 16, allowing turning of the pinion 40 by the predetermined turning amount in the take-up direction relative to the spool 16. However, the pinion 40 may, for example, deform a spring (an allowing unit) between the pinion 40 and the spool 16, in opposition to the urging force of the spring, to allow turning of the pinion 40 by a predetermined turning amount in the take-up direction relative to the spool 16.

The disclosures of Japanese Patent Application No. 2014-161258 filed Aug. 7, 2014 are incorporated into the present specification by reference in their entirety.

EXPLANATION OF THE REFERENCE SYMBOLS

10 Webbing take-up device
16 Spool
18 Webbing
24 Allowing portion (allowing unit)
30 Force limiter mechanism
34 Lock mechanism (regulation unit)
36 Lock base (regulating member)
38 Pretensioner mechanism
40 Pinion (turning member)
52 Activation mechanism (activation unit)
56 Lock pawl (activating body)
80 Webbing take-up device
86 Turning plate (activating body)

What is claimed is:

1. A webbing take-up device comprising:
   a spool onto which a webbing to be applied to a vehicle occupant is taken up, the webbing being taken up due to the spool turning in a take-up direction, and the spool being turned in a pull-out direction due to the webbing being pulled out;
   a regulation unit at which a regulating member that turns together with the spool is provided, the regulation unit regulating turning of the regulating member in the pull-out direction in a predetermined situation;
   a force limiter mechanism that, when the regulation unit regulates turning of the regulating member in the pull-out direction, allows turning of the spool in the pull-out direction relative to the regulating member by a load that is at least a force limiter load;

a pretensioner mechanism at which a turning member is provided, the pretensioner mechanism turning the spool in the take-up direction in the predetermined situation by turning the turning member in the take-up direction;

an allowing unit that, when the pretensioner mechanism turns the turning member in the take-up direction, allows turning of the turning member in the take-up direction relative to the spool by a predetermined turning amount;

a switching mechanism that switches the force limiter load from a high level to a low level;

an activation unit that is capable of allowing the switching mechanism to switch the force limiter load independently of the operation of the pretensioner mechanism, the force limiter load being the load at which the force limiter mechanism allows turning of the spool in the pull-out direction relative to the regulating member, turning of which in the pull-out direction is regulated by the regulation unit, due to the activation unit being activated as a result of the turning of the turning member in the take-up direction relative to the spool being allowed by the allowing unit.

2. The webbing take-up device according to claim 1, wherein the activation unit is activated due to the force limiter mechanism allowing the turning of the spool in the pull-out direction relative to the regulating member.

3. The webbing take-up device according to claim 1, further comprising an activating body that is provided at the activation unit and is connected to at least one of a turning member side or a spool side, the activation unit being activated due to the connection to the at least one of the turning member side or the spool side being released and the activating body being moved, by the turning of the turning member in the take-up direction relative to the spool, which is allowed by the allowing unit.

4. The webbing take-up device according to claim 3, wherein the activation unit is activated by the turning of the spool in the pull-out direction relative to the regulating member, which is allowed by the force limiter mechanism allowing movement of the activating body by the turning member, releasing the connection to the spool side, and the activating body being moved.

5. A webbing take-up device comprising:
a spool onto which a webbing to be applied to a vehicle occupant is taken up, the webbing being taken up due to the spool turning in a take-up direction, and the spool being turned in a pull-out direction due to the webbing being pulled out;
a regulation unit at which a regulating member that turns together with the spool is provided, the regulation unit regulating turning of the regulating member in the pull-out direction in a predetermined situation;
a force limiter mechanism that, when the regulation unit regulates turning of the regulating member in the pull-out direction, allows turning of the spool in the pull-out direction relative to the regulating member by a load that is at least a force limiter load;
a pretensioner mechanism at which a turning member is provided, the pretensioner mechanism turning the spool in the take-up direction in the predetermined situation by turning the turning member in the take-up direction;
an allowing unit that, when the pretensioner mechanism turns the turning member in the take-up direction, allows turning of the turning member in the take-up direction relative to the spool by a predetermined turning amount;
an activation unit that is capable of switching the force limiter load, due to the activation unit being activated as a result of the turning of the turning member in the take-up direction relative to the spool being allowed by the allowing unit;
an activating body that is provided at the activation unit and is connected to at least one of a turning member side or a spool side, the activation unit being activated due to the connection to the at least one of the turning member side or the spool side being released and the activating body being moved, by the turning of the turning member in the take-up direction relative to the spool, which is allowed by the allowing unit, and
a connection portion that is provided at the activation unit and connects the activating body to the turning member side, the connection portion being sheared by the turning of the turning member in the take-up direction relative to the spool, which is allowed by the allowing unit, and releasing the connection of the activating body to the turning member side.

6. A webbing take-up device comprising:
a spool onto which a webbing to be applied to a vehicle occupant is taken up, the webbing being taken up due to the spool turning in a take-up direction, and the spool being turned in a pull-out direction due to the webbing being pulled out;
a regulation unit at which a regulating member that turns together with the spool is provided, the regulation unit regulating turning of the regulating member in the pull-out direction in a predetermined situation;
a force limiter mechanism that, when the regulation unit regulates turning of the regulating member in the pull-out direction, allows turning of the spool in the pull-out direction relative to the regulating member by a load that is at least a force limiter load;
a pretensioner mechanism at which a turning member is provided, the pretensioner mechanism turning the spool in the take-up direction in the predetermined situation by turning the turning member in the take-up direction;
an allowing unit that, when the pretensioner mechanism turns the turning member in the take-up direction, allows turning of the turning member in the take-up direction relative to the spool by a predetermined turning amount;
an activation unit that is capable of switching the force limiter load, due to the activation unit being activated as a result of the turning of the turning member in the take-up direction relative to the spool being allowed by the allowing unit;
an activating body that is provided at the activation unit and is connected to at least one of a turning member side or a spool side, the activation unit being activated due to the connection to the at least one of the turning member side or the spool side being released and the activating body being moved, by the turning of the turning member in the take-up direction relative to the spool, which is allowed by the allowing unit, and
a connecting member that is provided at the activation unit and connects the activating body to the spool side, the connecting member being sheared or deformed by the turning of the turning member in the take-up direction relative to the spool, which is allowed by the allowing unit, and releasing the connection of the activating body to the spool side.

7. A webbing take-up device comprising:

a spool onto which a webbing to be applied to a vehicle occupant is taken up, the webbing being taken up due to the spool turning in a take-up direction, and the spool being turned in a pull-out direction due to the webbing being pulled out;

a regulation unit at which a regulating member that turns together with the spool is provided, the regulation unit regulating turning of the regulating member in the pull-out direction in a predetermined situation;

a force limiter mechanism that, when the regulation unit regulates turning of the regulating member in the pull-out direction, allows turning of the spool in the pull-out direction relative to the regulating member by a load that is at least a force limiter load;

a pretensioner mechanism at which a turning member is provided, the pretensioner mechanism turning the spool in the take-up direction in the predetermined situation by turning the turning member in the take-up direction;

an allowing unit that, when the pretensioner mechanism turns the turning member in the take-up direction, allows turning of the turning member in the take-up direction relative to the spool by a predetermined turning amount;

an activation unit that is capable of switching the force limiter load, due to the activation unit being activated as a result of the turning of the turning member in the take-up direction relative to the spool being allowed by the allowing unit;

an activating body that is provided at the activation unit and is connected to at least one of a turning member side or a spool side, the activation unit being activated due to the connection to the at least one of the turning member side or the spool side being released and the activating body being moved, by the turning of the turning member in the take-up direction relative to the spool, which is allowed by the allowing unit, and an urging member that is provided at the activation unit and that activates the activation unit by moving the activating body with an urging force.

* * * * *